United States Patent
Skalecki et al.

(10) Patent No.: US 7,590,051 B1
(45) Date of Patent: Sep. 15, 2009

(54) METHOD AND APPARATUS FOR REDIALING A CONNECTION ON A COMMUNICATION NETWORK

(75) Inventors: Darek Skalecki, Kanata (CA); Areef Reza, Ottawa (CA); Ewart Tempest, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 633 days.

(21) Appl. No.: 10/946,983

(22) Filed: Sep. 22, 2004

(51) Int. Cl.
*G01R 31/08* (2006.01)
(52) U.S. Cl. .................. 370/218; 370/231; 370/395.2
(58) Field of Classification Search .............. 370/216, 370/217, 218, 221–228, 230, 231, 235, 237, 370/395.2; 709/239, 242; 714/1, 2, 4, 25
See application file for complete search history.

(56) References Cited

U.S. PATENT DOCUMENTS

| | | | | |
|---|---|---|---|---|
| 5,598,403 | A * | 1/1997 | Tatsuki ....................... 370/221 |
| 5,802,319 | A * | 9/1998 | Faulk et al. ................. 709/249 |
| 6,272,107 | B1 * | 8/2001 | Rochberger et al. ......... 370/216 |
| 6,324,162 | B1 * | 11/2001 | Chaudhuri .................. 370/225 |
| 6,560,654 | B1 | 5/2003 | Fedyk et al. |
| 7,035,202 | B2 * | 4/2006 | Callon ........................ 370/216 |
| 2003/0095500 | A1 * | 5/2003 | Cao ............................. 370/216 |
| 2005/0013242 | A1 * | 1/2005 | Chen et al. .................. 370/228 |

FOREIGN PATENT DOCUMENTS

| WO | WO 9933214 A1 * | 7/1999 |
|---|---|---|
| WO | WO 02076021 A1 * | 9/2002 |

OTHER PUBLICATIONS

Shin, Sang-Heon et al., "Packet Lossless Fast Rerouting Scheme with Minimized Buffer Delay," IEEE/IFIP Network Operations and Management Symposium. Apr. 19-23, 2004. vol. 1, pp. 219-231.*

* cited by examiner

*Primary Examiner*—Donald L Mills
(74) *Attorney, Agent, or Firm*—Anderson Gorecki & Manaras LLP

(57) ABSTRACT

Resources used by a connection are released when a connection is terminated, for example due to a failure on the network. When the connection is to be redialed, an indication of the released resources is collected and provided to the network element that will perform a redial operation to determine the new path for the connection. This allows the network element to determine the new path using up-to-date information, while not allowing other nodes on the network to know about the recently released resources, so that the head-end node has an initial opportunity to use the recently released resources for the redialed connection. Subsequently any unused resources will be advertised on the network for use by other nodes. The head-end network element may be notified of the resources released from termination of the previous connection by causing a termination message to propagate from the tail-end node to the head-end node and collect feedback along the terminating connection path.

19 Claims, 4 Drawing Sheets

METHOD AND APPARATUS FOR REDIALING A CONNECTION ON A COMMUNICATION NETWORK

BACKGROUND

1. Field

This application relates to communication networks and, more particularly, to a method and apparatus for redialing a connection on a communication network.

2. Description of the Related Art

Data communication networks may include various computers, servers, hubs, switches, nodes, routers, proxies, and other devices coupled to and configured to pass data to one another. These devices will be referred to herein as "network elements." Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, and how routers should be configured to allow a protocol data unit to follow a particular path through the network.

Communication networks may be configured in multiple different topologies, such as ring-based topologies and mesh topologies. Ring-based topologies advantageously provide fast protection switching such that if a failure is experienced on a portion of the ring, traffic may be diverted the other way through the ring to minimize disruption on the network. One common ring-based topology which has been successfully deployed in North America and several other parts of the World is commonly referred to as Synchronous Optical NETwork (SONET) Bi-Directional Switched Ring (BLSR). Another similar standard that is used extensively in Europe and several other areas of the world is commonly referred to as Synchronous Data Hierarchy (SDH) Multiplex Section Shared Protection Ring (MS-SPRing).

Another common communication network topology is referred to as a mesh topology. Mesh topologies enable nodes on the mesh to communicate with multiple other nodes so that traffic is not required to be communicated to a specific node as it progresses through the network. To increase the speed at which traffic may be protection switched through a mesh network without requiring a new path to be dialed through the mesh network, it is possible to create virtual rings and reserve a portion of the bandwidth on those rings to carry protection traffic in the event of a failure. Logical restoration paths in a mesh-network are sometimes referred to as protection cycles, or p-cycles. P-cycles enable the network devices to perform fast link restoration protection without requiring notification of the source or destination nodes. Thus, in a mesh network the working path will be carried over a dialed route through the mesh network, while the restoration path will be carried over the logical ring. Mesh networks may be based on the SONET physical layer or other physical layer protocol. Other automatic protection mechanisms may be used as well depending on the underlying network architecture.

Occasionally, the automatic protection afforded by the SONET/SDH or mesh network architecture is not sufficient to maintain connectivity between points on the network. In this situation, a new path through the network will need to be determined using a process referred to herein as redial. Redialing a connection is well known in the art, and essentially requires one of the network elements handling the traffic on the network to obtain a new route through the network. This may be accomplished by extracting routing information and network topography information from a routing database and computing a desirable route through the network. In particular networks where traffic engineering is implemented to distribute traffic on the network more evenly, the network element responsible for performing the redial will have a database containing a list of nodes and links interconnecting the nodes, and an indication of the amount of bandwidth available on the links. This allows the network element to choose a route through the network that has available capacity or at least a reduced chance of congestion. As used herein, the network element configured to compute a new path will be referred to as the head-end node. The last node in the path will be referred to as the tail-end node. A given connection through the network may have multiple segments, each of which have a head-end and tail-end node. The head-end and tail-end nodes may correspond to edges of a network domain, or may otherwise be designated to perform routing functions on the network.

Routing protocols exchange available routes, and optionally bandwidths as discussed above, through the use of route advertisements. There are many different routing protocols and the manner in which information is disseminated and used may vary considerably between the various protocols. In general, however, as resources are used or released, or as links and nodes fail or are added to the network, new routing advertisements are generated and propagated through the network. Thus, when resources such as bandwidth on a link are released, the routing protocol will advertise the new availability on the link, which will be populated into the routing databases of the various network elements on the network. However, the advertisement may not be immediate and thus it may take some time for the new state of the network to converge to reflect the new availability on the released links. At the same time, however, other network elements may be dialing new connections over the link, to thereby once again reduce the capacity on the link.

FIG. 1 illustrates a communication network 10 in which network elements 12 are connected together to allow communications to occur. In the example network of FIG. 1, a connection 14 has been configured on the network through network elements [10, 3, 2, 7]. In this example, node [10] will be referred to as the head-end node and node [7] will be referred to as the tail-end node. The nodes on the network may be many different types of network elements, depending on the type of network being used, and may be for example routers, switches, or other types of common network elements.

If there is a failure on the network, such as if the link between node [3] and node [2] fails, connectivity may be restored by protection switching the traffic onto a different previously configured path on the network. For example, if the group of nodes [10, 3, 2, 6, 4] formed a ring/p-cycle, the traffic may be automatically detoured around the failed link by causing traffic to flow the other way around the ring/p-cycle. This failure recovery occurs at the transport protocol level, rather than at the routing layer. If recovery using the underlying transport technology is not possible, which may occur for a number of reasons, a new path or route through the network will need to be found for the connection. FIG. 2 illustrates an example of what the connection may look like if it was re-dialed on the network. Specifically, as shown in FIG. 2, the connection may change to be configured through network elements [10, 3, 1, 2, 7]. Other connections may be determined as well, and the invention is not limited to these particular examples.

Conventionally, when a fault on a connection was detected, the network elements adjacent the fault would send termination messages along the path toward both the head-end and the tail-end. Upon receipt by the head-end, the head-end would inspect its routing database and dial a new connection. The termination messages would be used by the nodes along the failed connection as an indication that the resources were no longer required. Thus, the nodes would release those resources and advertise their availability in subsequent routing advertisements.

Unfortunately, the delay between release of the resources and receipt by the head-end of the routing advertisement typically precluded the routing advertisement from updating the routing table of the head-end node prior to calculation of the new redial route through the network. Thus, the available resources along the previous path could not be made available to the head-end node for use on the new redial path, even though the head-end node was previously using those resources. Where the released resources are the only ones available on the network, this may preclude a connection from being established. Increasing the frequency with which routing advertisements are generated may increase the likelihood that the head-end will have the requisite updated routing information, but increases the number of route advertisements required to maintain routing databases on the network which decreases the scalability of the network. Additionally, if the routing advertisements relating to the released resources are sent to all routers on the network, other network elements may reserve the resources for other connections, thus precluding the original connection from being redialed.

SUMMARY OF THE DISCLOSURE

As described in greater detail below, a method and apparatus for redialing a connection on a communication network enables resources released due to a failure on the network to be communicated to the head-end node associated with the failing connection to enable the head-end node to have updated routing information when computing the redial connection. According to an embodiment of the invention, a termination message is generated by the tail-end node upon being notified of a failure along a route on the network. The tail-end node will cause the termination message to flow back along the path used by the route to release resources along the route. An indication of the released resources are added to the termination message to allow a record to be built, optionally in the form of a routing advertisement, which will flow along with the termination message or be a part of the termination message. This record is referred to herein as feedback. Upon receipt of the termination message, the head-end node will use the feedback associated with the termination message to update its routing table and compute a new redial path for the connection. The redial path may optionally use some of the resources released and recorded by the termination message.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, connections may be redialed in a communication network by causing network resources to be released, and to have the release of those network resources communicated to the head-end network element, configured to determine a new path for the connection. This allows the network element to determine the new path using up-to-date information, while not allowing other nodes on the network to know about the recently released resources, so that the head-end node has an initial opportunity to use the recently released resources for the redialed connection. Subsequently any unused resources will be advertised on the network for use by other nodes.

The head-end network element may be notified of the resources released from termination of the previous connection in several ways. For example, a termination message may be used to terminate the connection along the path and propagate from the tail-end node to the head-end node. As the termination message proceeds to release resources, it collects feedback as to the particular resources that were released. The feedback optionally may be formatted as a routing update. When the termination message is received by the head-end node, the head-end node uses the feedback to update its routing database, and computes a new route through the network using the updated routing information. In this manner, the head-end node may be notified of released resources as a result of the terminated connection in advance of other network elements and in advance of standard routing advertisements and routing convergence. Aspects of the invention may be employed for example in a SONET/SDH based network, a mesh network, or other type of networks where the control plane is separate from the data plane.

In the following description, it will be assumed that the control plane is an Internet-Protocol (IP) based control plane and is separate from the data plane. Thus, even where the data plane is experiencing a failure, the control plane may be operational and a packet may traverse the same path on the control plane to enable messaging to occur along the now failed data path. Where the messaging packets are carried in the data plane, which is experiencing a failure, the packets may be routed along a different route between the network elements where the failure has occurred. Accordingly, it will be assumed herein that the path through the network may be used by a control message, even though the associated data path is experiencing failure.

Figure 1:
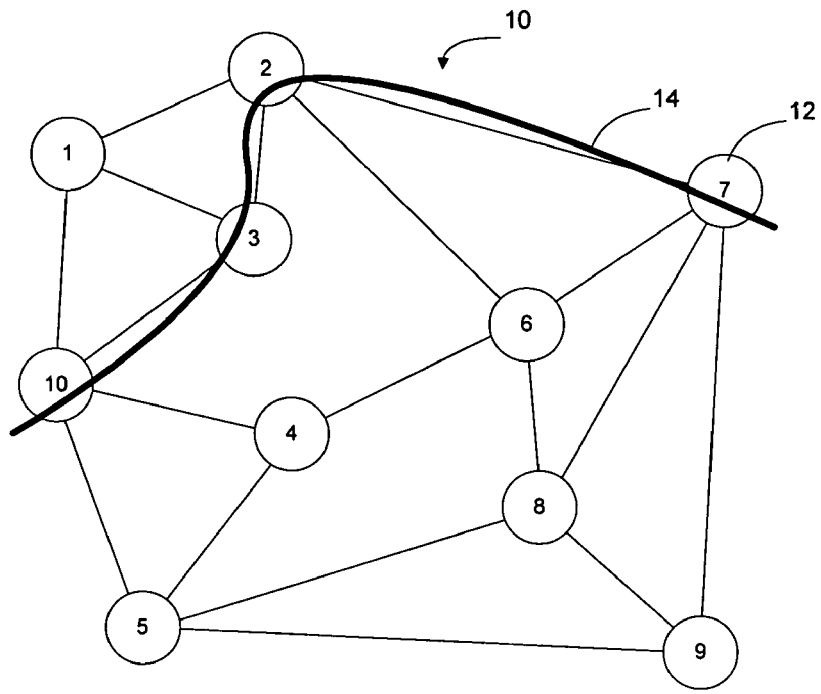
FIG. 1 is a functional block diagram of a network topology illustrating a connection provisioned through the communication network.
Figure 2:
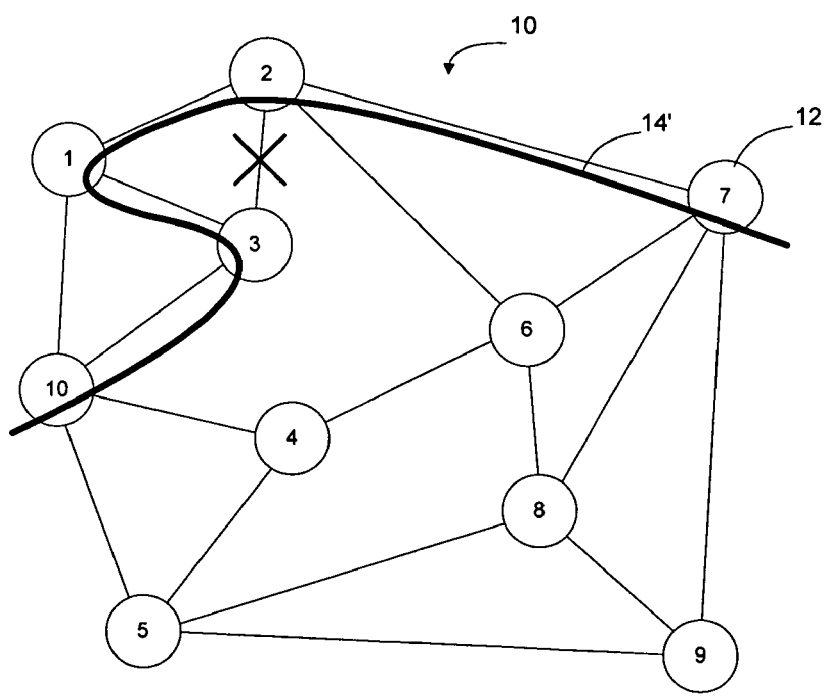
FIG. 2 is a functional block diagram of the network topology of FIG. 1 with a redialed connection provisioned through the communication network.
Figure 3:
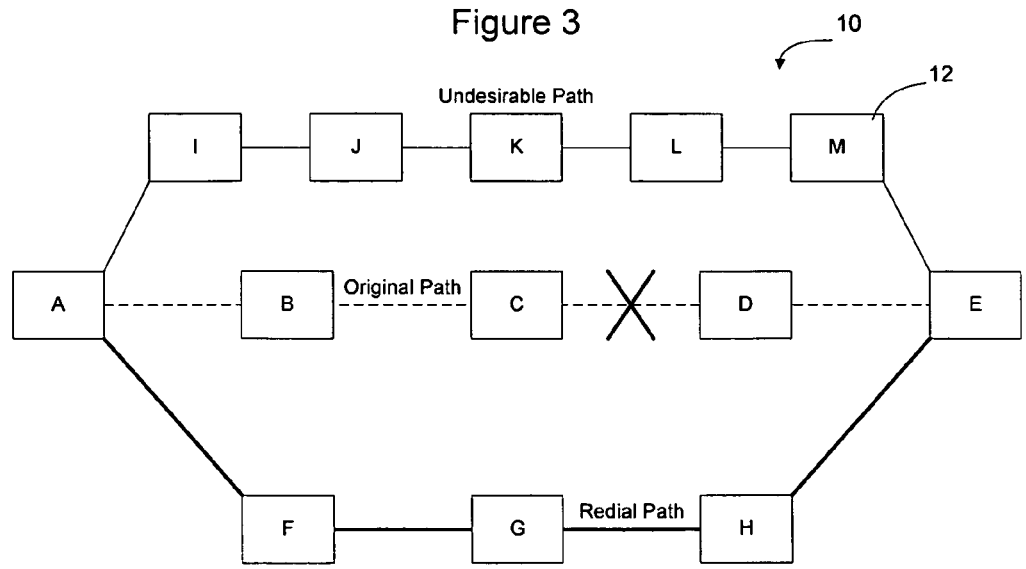
FIG. 3 is a functional block diagram of a network topology illustrating an original and redialed path.
Figure 4:
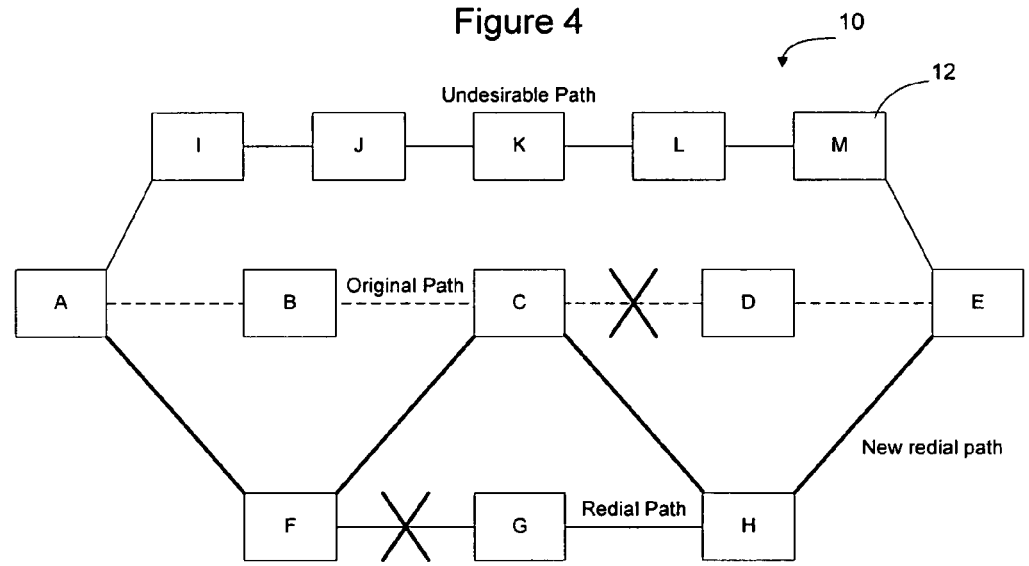
FIG. 4 is a functional block diagram of a network topology illustrating an original path, redialed path, and a new redialed path.

FIGS. 3 and 4 show two examples of redialed connections that may be created between a head-end node A and a tail-end node E. The invention is not limited to the particular type of device used as head-end node or tail-end node, as the particular implementation will depend on the type of network being implemented. For example, in an MPLS network, nodes A and E may be Label Edge Routers configured to establish Label Switched Paths through the core of Label Switch Routers. In another type of network the network elements would be differently configured and the invention thus may be used with many types of networks. The invention is also not limited to creation of one of these types of paths, as other paths may be created as well.

In a given network, there may be one or a select subset of optimal paths through the network between a given pair of endpoints. There may also be any number of undesirable paths. When a failure occurs on an original path, a redial path may need to be created. This situation is illustrated in FIG. 3. When the redial path fails, a new redial path may need to be created. This situation is illustrated in FIG. 4. The invention may be used in either situation to communicate routing updates to the head-end node, or other network element configured to make routing decisions on the network, so that the network element is able to make routing decisions with the most up-to-date information. This up-to-date information includes information related to resources released due to the termination of the path that is being replaced on the network. Thus, in the example of FIG. 3, the up-to-date information would include information about resources on the original path that were released upon termination of the original path. Similarly, as shown in FIG. 4, the up-to-date information would include information related to the resources that were returned upon termination of the redial path.

The new connection to be created on the network may include a complete new set of resources, such as the redial connection shown in FIG. 3, or may re-use a subset or all remaining resources released as a result of the termination of the previous path, as shown in FIG. 4. Reuse of resources is enabled by providing the up-to-date information to the head-end, so that the head-end knows which resources were released on the network in connection with the termination of the previous connection.

Figure 5:
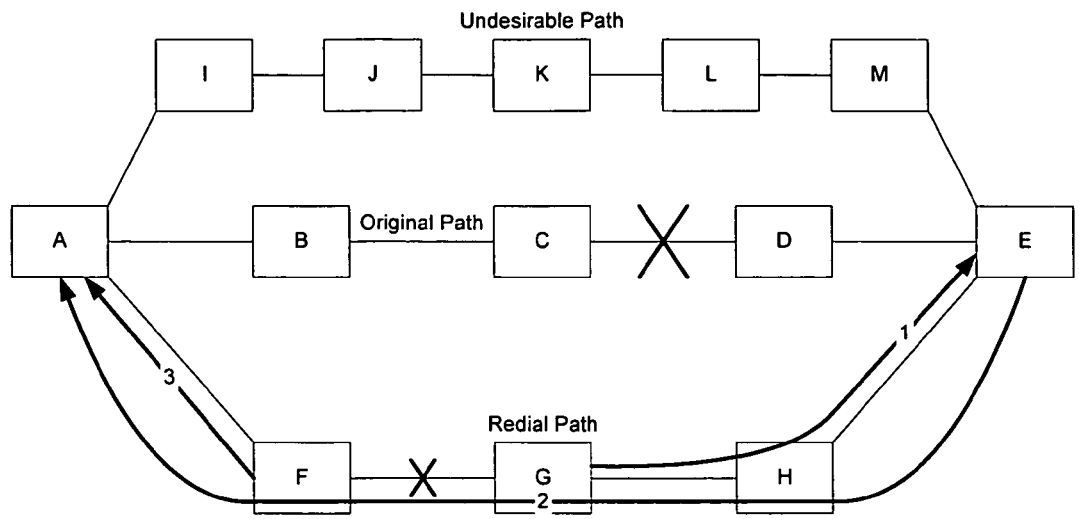
FIG. 5 is a functional block diagram of a network topology illustrating the propagation of control messages associated with terminating a network connection, and providing feedback to a head-end node according to an embodiment of the invention.
Figure 6:
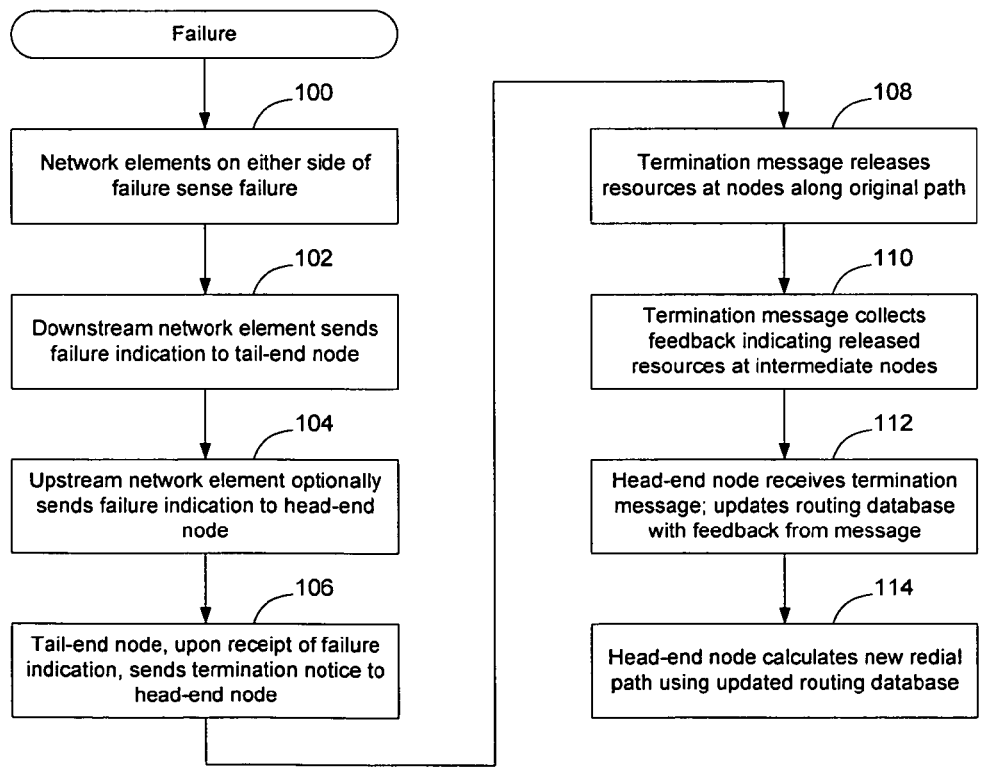
FIG. 6 is a flow diagram illustrating a process of terminating a path and redialing a new connection on a communication network, using the control messages illustrated in FIG. 5 according to an embodiment of the invention.

FIG. 5 illustrates messaging that may be used to communicate up-to-date information related to the released resources to the head-end node in connection with termination of a path over the network. FIG. 6 illustrates a flow chart of this process, and will be described in connection with FIG. 5. As shown in FIGS. 5-6, in this example it will be assumed that there is a path extending between head-end node A and tail-end node E that passes through nodes [F, G, H]. In this example it will also be assumed that there is a link failure between nodes [F] and [G].

When nodes adjacent the failure detect that a failure has occurred (100), the downstream node sends a failure indication (arrow 1 in FIG. 5) to the tail-end node (Node [G]) to instruct the tail-end node to initiate termination of the connection (102). Since termination will occur in this embodiment at initiation of the tail-end node, the upstream node (Node [F]) is not required to do anything. However, the upstream node may optionally send a failure indication (arrow 3 in FIG. 5) to the head-end node to provide the head-end node with early notice that the path is down so that the head-end node may stop sending packets along the path and/or prepare to create a new path for the connection (104). The head-end node may also generate billing records or an alarm to enable the failure to be logged and to allow the network operator to be notified of the failure. Optionally these functions may occur in response to another message, however, such as in response to one of the other messages discussed in greater detail below, and the invention is thus not limited to the manner in which the failure indication is processed.

When the tail-end node receives the failure indication, it sends a termination message (arrow 2 in FIG. 5) to the head-end node along the path of the previous connection (106). The termination message causes the network elements along the path to release the resources that had previously been reserved for the connection (108), such as bandwidth, time slots, and memory allocations, so that those resources may be used for other connections on the network. The invention is not limited to the type of resources that are released by the network elements.

In many networks, the network may be viewed as having two planes—a data plane that carries traffic on the network and a control plane that is used to instruct the data planes as to how traffic should be handled. The network elements implementing the network likewise have two planes, a control plane with a processor and a data plane that is configured to be optimized to handle packets or frames of data on the network. In this architecture, a termination message may traverse the same path of the previous connection since the termination message will be handled by the control plane of the network elements along the path. Thus, although there is a data-plane failure, which will prevent traffic from being handled on the path, the control planes of the network elements will still be able to release resources and otherwise pass the termination message along the path. Messages to be handled by the data plane on behalf of the control plane may take detour routes around failures on the data plane to allow the messaging to be handled by the network elements along the route.

In addition to causing the network elements to release the resources that had been allocated to the terminating path, the termination message also collects feedback indicating the identity of the released resources at the intermediate nodes (110). The feedback will be used, ultimately, to update the head-end node's routing database so that the head-end node is able to compute a new route using the most up-to-date information available, including the information related to the resources that were released for use as a result of the termination of the previous connection.

When the head-end node receives the termination message, it updates its routing table with feedback from the message (112). The feedback may be in the form of a routing update and formatted to resemble a routing advertisement, or may take other forms depending on the manner in which the feedback is implemented. The feedback may contain the aggregate bandwidth available on a link, an incremental amount of bandwidth available, or information related to another metric depending on the type of routing protocol in use and the types of information used by the protocol to determine connections through the network.

Feedback may be collected along the path using a number of different techniques. One method of collecting feedback on a link state routing network is described in U.S. Pat. No. 6,560,654, the content of which is hereby incorporated herein by reference. Other manners of collecting feedback may be used as well, and the invention is not limited to the use of the feedback mechanism disclosed in that U.S. Patent.

Where the network is a SONET/SDH based network, the resources that are released along the broken path will generally be time-slots that were used to carry the connection. The feedback in this instance will carry the released time-slot information back to the head-end node to allow those now available time-slots to be used, if necessary, when computing the new path through the network. The invention is not limited to use on a SONET/SDH network, however, as it may also be used on other types of networks as well.

Once the feedback is received at the head-end node, the head-end node calculates a new route using the updated routing database (114), creates a new path along that route and uses it for transmission of traffic. Where the signaling system is disjoint from the routing system, receipt of the termination message by the signaling system with a routing update may cause the network element to pass the routing information to the routing system, along with instructions for the routing system to calculate a new route using the routing update. The invention is not limited to a network element implementing a system where signaling is distinct from routing.

In the above-described example, a termination message carrying feedback from the tail-end node to the head-end node was used to update the routing database of the head-end node. By carrying feedback along with the termination message, the head-end node is able to update its databases congruently with initiating the redial process. Other manners of collecting information about the released resources may be used as well, however, and the invention is not limited to the process discussed in connection with FIGS. 5 and 6.

In the above-example, the head-end and tail-end were assumed to be on the same domain such that the feedback between the network elements was possible and not restricted by network policy. In an inter-domain situation, where the exchange of network domain topography and routing information may be restricted, other mechanisms may be used. For example, the above-described feedback mechanism may be used only within the domain to redial a new connection for use within that domain. Where the failure is at an edge network element configured to connect the two domains, a standard selection mechanism may be used to select a new edge network element. The above-described feedback mechanism may then be used to communicate the release of resources within each of the domains, as well as the resources associated with the domain border network element, to the head-end nodes in those domains. Other mechanisms may be used for inter-domain traffic as well, and the invention is not limited to the several examples provided herein.

Thus, for example, recovery may be tried initially within the domain, and if recovery is not possible within the domain, interdomain recovery may be attempted. Since routing advertisements for interdomain traffic are typically limited to advertisement of inter-domain link information, the feedback in this instance would be likewise be limited to the resources on the inter-domain link that were released as a result of the termination. Standard inter-domain routing protocols may then be used to establish a new path through the multiple domain network.

Figure 7:
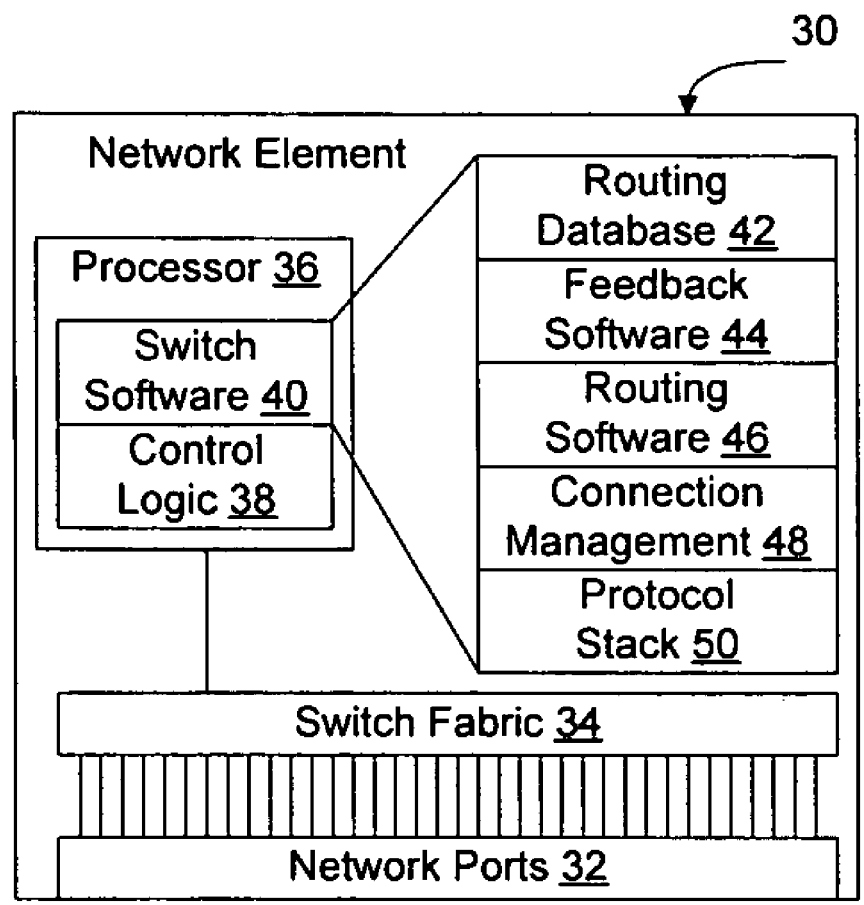
FIG. 7 is a functional block diagram of a network element configured to implement an embodiment of the invention.

FIG. 7 illustrates a network element that may be used as a head-end node, tail-end node, or intermediate node on the communication networks described above. Although FIG. 7 will be described as being configured to perform the functions of the head-end node, the network element may also be programmed or otherwise configured to perform the functions of one of the other nodes on the network. A given node may operate as a head-end node for particular connections, and as a tail-end node or intermediate node for other connections. Thus, a given network element may be configured to operate in several capacities on the network.

As shown in FIG. 7, a network element 12 includes network ports 32 configured to enable it to receive and transmit communications on a communications network. The node may also include other components, conventionally found in a node on a communication network, such as a switch fabric 34 and other conventional components. According to an embodiment of the invention, the node includes a processor 36 containing control logic 38 configured to implement embodiments of the invention. Specifically, as shown in FIG. 7, switch software 40 may be instantiated on control logic 38 to enable the processor to implement the functions ascribed to the node 12 discussed herein in connection with FIGS. 1-6.

The network element has a native or interfaced memory containing data and instructions to enable the processor to implement the functions ascribed to it herein, and contained in the switch software 40. Alternatively, the switch software may be coded directly into a programmable logic device such as an ASIC or FPGA. The invention is thus not limited to a software embodiment.

The switch software 40 includes a routing database 42 configured to store routing information learned from routing advertisements and from feedback received from messages on the network. The switch software also includes feedback software 44 configured to collect feedback from messages, update feedback information if the network element is releasing resources on the network, and otherwise participate in feedback exchanges on the network. The switch software also includes routing software 46 to enable the network element to implement one or more routing protocols on the network. The routing software may allow the network element to take actions such as to compute routes using information contained in the routing database, interface a routing server configured to create routes on the network, or otherwise implement routes on the network. Optionally, connection management software 48 may also be included to keep track of and manage connections on the network.

The network element may also include a protocol stack 50 to enable it to take action on the network and otherwise engage in protocol exchanges on the network. For example, in a SONET network the protocol stack may contain information associated with the SONET standard to enable the node to comply with the SONET standards and otherwise communicate on the SONET network. In a mesh network the protocol stack would contain data and instructions to enable the network device to comply with whatever standards are being used in the mesh network.

It should be understood that all functional statements made herein describing the functions to be performed by the methods of the invention may be performed by software programs implemented utilizing subroutines and other programming techniques known to those of ordinary skill in the art. Alternatively, the functional aspects of the invention described herein may be implemented in hardware, firmware, or a combination of hardware, software, and firmware. The invention is thus not limited to a particular implementation.

The control logic 38 may be implemented as a set of program instructions that are stored in a computer readable memory within the network element and executed on a microprocessor, such as processor 36. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

Various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of determining a new route for a connection on a communication network after detection of a fault on an old route for the connection, the method comprising the steps of:
   upon receipt of indication of a fault on the old route for the connection, releasing resources associated with the old route for the connection by nodes on the old route for the connection;
   forwarding an indication of the resources released by the nodes, by the nodes on the old route for the connection, to a node responsible for determining the new route for the connection; and
   upon receipt of the indication of the released resources, using the indication of the released resources along with other network information to determine the new route for the connection.

2. The method of claim 1, wherein the step of releasing resources is performed upon detection of a failure on the network.

3. The method of claim 1, wherein the connection has a head-end node and a tail-end node, and wherein the step of releasing resources comprises notifying the tail-end node of a failure on the old route for the connection and initiating, by the tail-end node, termination of the old route for the connection.

4. The method of claim 3, wherein the old route for the connection is formed from a series of intermediate nodes, each of said intermediate nodes contributing resources to the connection, and wherein initiating termination of the old route for the connection comprises issuing a termination message by the tail-end node to the series of intermediate nodes.

5. The method of claim 4, wherein the termination message proceeds to the series of intermediate nodes, and wherein the step of forwarding an indication of the resources released by the nodes comprises adding information to the termination message, by the intermediate nodes, as resources associated with the old route for the connection are released.

6. The method of claim 5, wherein the step of using the indication of the released resources comprises the steps of updating a routing database; and using the updated routing database to determine the new route for the connection.

7. The method of claim 6, wherein the new route for the connection comprises at least a portion of the released resources from the old route for the connection.

8. The method of claim 1, wherein the old route for the connection extends between a head-end node and a tail-end node through at least one intermediate node, the method further comprising the step of notifying the tail-end node of a failure on the old route for the connection by the intermediate node.

9. The method of claim 8, further comprising the step of initiating termination of the old route for the connection by the tail-end node upon receipt of notice of the failure on the old route for the connection.

10. The method of claim 9, wherein the step of initiating termination of the old route for the connection comprises issuing a termination message to at least one intermediate node to cause the intermediate nodes to perform the step of releasing resources associated with the connection, and wherein the step of releasing resources further comprises the step of adding feedback to the termination message.

11. A network element, comprising:
    control logic configured to receive a termination message relating to an active connection on a communication network;
    control logic configured to release resources associated with the active connection;
    control logic configured to update feedback associated with the termination message to include an indication of the resources that were released from the active connection; and
    control logic configured to forward the feedback toward a second network element to allow the second network element to use the feedback in connection with determining a new route for the connection on the communication network.

12. The network element of claim 11, wherein the feedback is incorporated into and forms part of the termination message.

13. The network element of claim 11, wherein the feedback includes a routing update.

14. The network element of claim 11, wherein the second network element is a head-end network element.

15. The network element of claim 11, further comprising control logic configured to receive a failure indication message and forward the failure indication message toward the second network element on the connection.

16. The network element of claim 15, wherein the second network element is a tail-end network element associated with the connection.

17. The network element of claim 15, wherein the termination message is generated by the tail-end network element in response to receipt of the failure indication message.

18. A head-end node, comprising:
    signaling means for receiving a termination message comprising feedback indicative of resources released along a first route associated with a failed connection on a communication network; and
    routing means for determining a second route for the connection on the communication network upon receipt of the termination message using the feedback from the termination message.

19. The head-end node of claim 18, further comprising means for updating a routing database using said feedback prior to determining the second route for the connection through the network.

* * * * *